United States

[11] 3,614,208

[72] Inventors Tohru Matsumoto
Tokyo-to;
Tomokazu Kazamaki, Tokyo, both of Japan
[21] Appl. No. 881,354
[22] Filed Dec. 2, 1969
[45] Patented Oct. 19, 1971
[73] Assignee Asahi Kogaku Kogyo Kabushiki Kaisha
Tokyo-to, Japan
[32] Priority Dec. 4, 1968
[33] Japan
[31] 43/88352

[54] UNITY MAGNIFICATION SYMMETRICAL LENS SYSTEM
4 Claims, 5 Drawing Figs.

[52] U.S. Cl. .................................................. 350/214
[51] Int. Cl. .................................................. G02b 9/64
[50] Field of Search ....................................... 350/215,
216, 214, 175 TS, 212

[56] References Cited
UNITED STATES PATENTS
2,481,639 9/1949 Altman et al. .................. 350/214 X Primary Examiner—John K. Corbin
Attorney—Stanley Wolder ABSTRACT: A unity magnification lens system of focal length F comprises a symmetrical pair of similar telephoto lens systems and includes 12 lenses, the sixth and seventh lenses being singlets or doublets and the remaining lenses being singlets, the first, fifth, eighth and twelfth lenses being negative and the rest positive. The absolute value of each lens face radius of curvature exceeds 0.7F and of each positive lens exposed face exceeds F, the index of refraction of each positive lens exceeds 1.65, and the rear face of the first lens and the front face of the twelfth lens are concave with absolute radii of curvature between 0.7F and 1.5F.

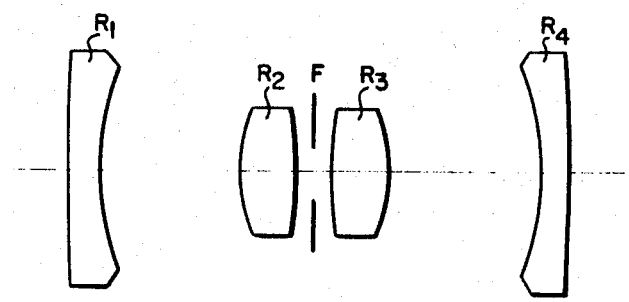
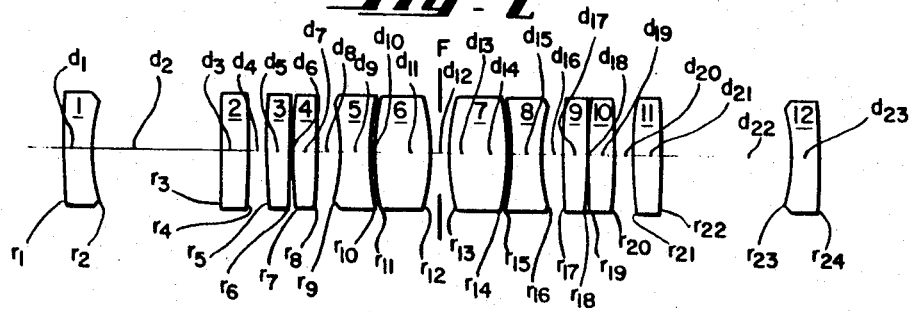
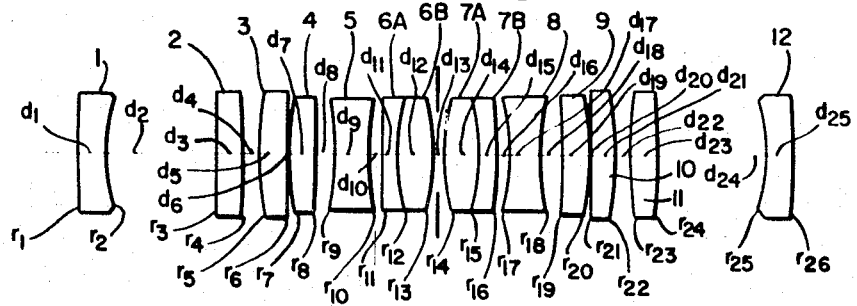

Fig. 4
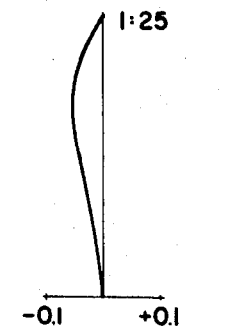
SPHERICAL ABERRATION
AND SINE CONDITION
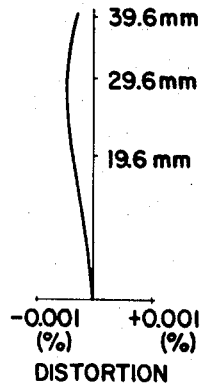
DISTORTION
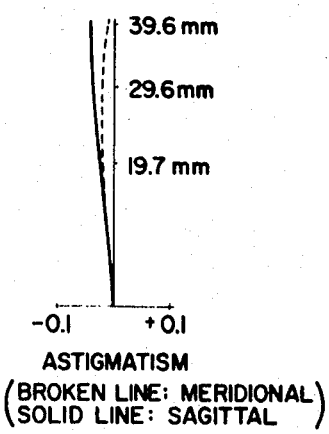
ASTIGMATISM
(BROKEN LINE: MERIDIONAL)
(SOLID LINE: SAGITTAL)
Fig. 5
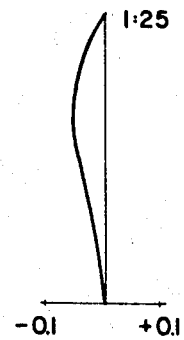
SPHERICAL ABERRATION
AND SINE CONDITION
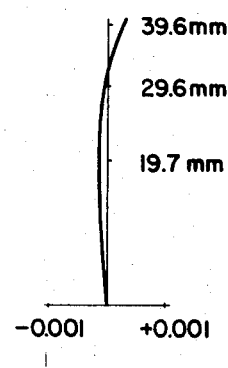
DISTORTION
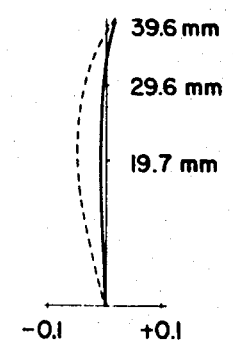
ASTIGMATISM
(BROKEN LINE: MERIDIONAL)
(SOLID LINE: SAGITTAL)
INVENTOR
TOHRU MATSUMOTO
BY *Stanley Wolder*
ATTORNEY

UNITY MAGNIFICATION SYMMETRICAL LENS SYSTEM

BACKGROUND OF THE INVENTION

The present invention relates generally to improvements in lens systems and it relates particularly to an improved unity magnification lens system.

A conventional wide-angle objective lens system with small distortion aberration, as typified by the Zeiss Viogon objective, is characterized by a pair of similar telephoto lens systems symmetrically positioned relative to a medially axially located diaphragm. As seen in FIG. 1 of the drawings, hereinafter identified, the double telephoto lens system of the present invention generally includes a front telephoto lens system including a front outer negative lens group $R_1$ followed by a spaced inner second positive lens group $R_2$ positioned at the front or object side of a diaphragm F and a second telephoto lens system positioned at the rear on the image side of diaphragm F and includes a front inner positive lens group $R_3$ followed by a spaced outer fourth negative lens group $R_4$, lens groups $R_1$ and $R_2$ defining a first telephoto lens system and $R_3$ and $R_4$ defining a second telephoto lens system similar to and symmetrical relative the first telephoto lens system. The conventional double telephoto wide angle objective lens system possesses numerous drawbacks and disadvantages. It possesses relatively high Seidel's coefficients and significant aberration values and otherwise leaves something to be desired.

SUMMARY OF THE INVENTION

It is a principal object of the present invention to provide an improved lens system.

Another object of the present invention is to provide an improved highly corrected wide-angle objective lens system.

Still another object of the present invention is to provide an improved lens system of the symmetrical double telephoto lens type.

A further object of the present invention is to provide an improved lens system of the above nature characterized by very low Seidel's coefficients and very low aberration.

The above and other objectives of the present invention will become apparent from a reading of the following description taken in conjunction with the accompanying drawings which illustrate preferred embodiments thereof.

In a sense the present invention contemplates the provision of a substantially unity magnification lens system of overall focal length F comprising a symmetrical pair of front and rear substantially similar telephoto lens systems each including a negative outer lens group and a positive inner lens group and characterized in that:

a. the absolute value of the radius of curvature of each lens face is greater than 0.7F;

b. the absolute value of the radius of curvature of the exposed lens faces of each lens is greater than F;

c. The index of refraction of each positive lens is greater than 1.65;

d. the rear inner lens group includes a negative lens and the lenses are so related and dimensioned that rays parallel to the optical axis between said telephoto lens systems issue from said negative lens as diverging rays;

e. the rear outer and inner lens groups are spaced to form a telephoto objective lens system; and f. said rear outer lens group comprises a rear negative lens with a concave front face of absolute radius of curvature between 0.7F and 1.5F.

To great advantage the improved lens system includes 12 successive lenses symmetrically arranged on opposite sides of a medially axially located diaphragm. The first and 12th lenses are negative lenses with inwardly facing concave faces of greater curvature than their outside faces, and the fifth and eighth lenses are double concave lenses, the remaining lenses being positive lenses. All of the lenses are single element lenses except for the sixth and seventh lenses which may be single element lenses or doublets with cemented confronting mating surfaces.

In the present lens system, the rays which issue from a point on the optical axis are caused to sharply diverge by the negative first lens 1 of the front lens group. Then, after passing through the second lens 2 through the sixth lens 6 of the positive lens group, said rays pass through the diaphragm F as rays which are parallel with the optical axis. These parallel rays pass through the rear lens groups, namely the seventh lens 7 through the twelfth lens 12, and form a unity magnification image.

In order to obtain such a lens system of high quality, it is necessary to make the Petzval sum smaller than in the case of an ordinary objective, and also to make the spherical aberration small. Seidel's coma term is made small through the law of symmetry, but, actually, to remove coma aberration is very difficult. Distortion aberration is removed through the law of symmetry almost satisfactorily.

It has been found that to obtain a unity magnification objective of the subject type in which the aberrations are highly compensated, it is necessary to satisfy the above six conditions (a) to (f). The conditions (a) and (b) function to minimize spherical aberration and coma aberration. In conventional lens systems, however, with such conditions only it is difficult to eliminate curvature of image field. In the lens system of the present invention, the provision of the further conditions (c), (d) and (e) serves to reduce the Petzval sum.

Condition (f), the concave front face of the rearmost negative lens being made larger than 0.7F, is necessary for reducing the coma aberration caused by this surface. Since this surface serves also for compensating astigmatism, too large a value of the radius of curvature would make the astigmatism compensation difficult, and for this compensation it would be necessary to have a greater curvature of the second surface of the second lens, which would inevitably result in aggravation of coma aberration. For such reason, it is necessary to have a radius of curvature which is smaller than 1.5F.

The improved lens system is of substantially unit magnification and is characterized by very low Seidel's coefficients and very low aberration.

BRIEF DESCRIPTION OF THE DRAWINGS

FIG. 1 is a schematic diagram generally illustrating the principal of a lens system according to the present invention;

FIG. 2 is a longitudinal sectional view of a preferred embodiment of the present invention;

FIG. 3 is a longitudinal sectional view of another embodiment of the present invention;

FIG. 4 are graphs of the aberration characteristics of the lens system of FIG. 2; and FIG. 5 are graphs of the aberration characteristics of the lens system of FIG. 3.

DESCRIPTION OF THE PREFERRED EMBODIMENTS

Referring now to the drawings and particularly FIG. 2 thereof which illustrates a preferred embodiment of the present invention, the improved lens system comprises 12 lenses consecutively designated as the first to the twelfth lens, the first to the sixth lens constitute a first telephoto lens system and the seventh to the twelfth lens constitutes a second telephoto lens system similar to the first telephoto lens system and symmetrical thereto relative to a diaphragm F located between the sixth and seventh lens. The first lens 1 defines the first lens group as identified above and is negative with a convex outer or front face and a concave rear or inner face of greater curvature than the outer face and the twelfth lens 12 defines the fourth lens group and is similar and symmetrical to lens 1 with a convex rear outer face and a concave front or inner face of greater curvature than the outer face. The second to sixth lenses and the seventh to eleventh lens define the second and third groups respectively, the second and third groups including similar lenses symmetrical relative to diaphragm F. The second lens 2, fourth lens 4, sixth lens 6, seventh lens 7, ninth lens 9 and eleventh lens 11 are positive double convex lenses and the third lens and tenth lens 10 are positive meniscus lenses with convex outer faces.

The lens faces are successively consecutively identified as the first to the twenty-fourth from the front face of lens 1 to the rear face of lens 12 and $r_i$ designates the radius of curvature of the $i$th lens face, that is the front and rear faces of lens 1 are designated $r_1$ and $r_2$ respectively, of lens 2, $r_3$ and $r_4$ ....., and of lens 12, $r_{23}$ and $r_{24}$. The axial distance between the $i$th lens face and the next successive or $i+1$ lens face is designated as $di$; $d_1$, $d_3$, $d_5$ ..... $d_{23}$ designating the thicknesses of lenses 1, 2, 3 ..... 12 respectively, and $d_2$, $d_4$, $d_6$ ..... $d_{22}$ designating the spacing between lenses 1 and 2, 2 and 3, 3 and 4 ..... 11 and 12 respectively.

The following example I sets forth the specific values and relationships of a lens system of FIG. 2, by way of illustration, the lens system having a brightness value of 1:2.5, a numerical aperture value of 0.1, $f_B = f_B' = 97.78$, $F = 102.6$, and $e$-line compensation up to $d$-line, $n_n$ and V being the index of refraction and Abbe's number of the $n$th lens:

EXAMPLE I

| R | D | $N_e$ | $V_d$ |
|---|---|---|---|
| $r_1$ = 733.498 | $d_1$ = 14.09 | $n_1$ = 1.58483 | 40.8 |
| $r_2$ = 107.246 | $d_2$ = 70.44 | | |
| $r_3$ = 1,722.209 | $d_3$ = 14.09 | $n_2$ = 1.73235 | 54.8 |
| $r_4$ = −398.531 | $d_4$ = 9.02 | | |
| $r_5$ = 425.155 | $d_5$ = 14.09 | $n_3$ = 1.73235 | 54.8 |
| $r_6$ = −867.243 | $d_6$ = 0.56 | | |
| $r_7$ = 568.460 | $d_7$ = 14.09 | $n_4$ = 1.73235 | 54.8 |
| $r_8$ = −896.762 | $d_8$ = 11.27 | | |
| $r_9$ = −99.030 | $d_9$ = 18.74 | $n_5$ = 1.64419 | 34.6 |
| $r_{10}$ = 279.822 | $d_{10}$ = 1.41 | | |
| $r_{11}$ = 296.460 | $d_{11}$ = 28.17 | $n_6$ = 1.73235 | 54.8 |
| $r_{12}$ = −146.748 | $d_{12}$ = 10.40 | | |
| $r_{13}$ = 146.748 | $d_{13}$ = 28.17 | $n_7$ = 1.73235 | 54.8 |
| $r_{14}$ = −296.460 | $d_{14}$ = 1.41 | | |
| $r_{15}$ = −279.822 | $d_{15}$ = 18.74 | $n_8$ = 1.64419 | 34.6 |
| $r_{16}$ = 99.030 | $d_{16}$ = 11.27 | | |
| $r_{17}$ = 896.762 | $d_{17}$ = 14.09 | $n_9$ = 1.73235 | 54.8 |
| $r_{18}$ = −568.460 | $d_{18}$ = 0.56 | | |
| $r_{19}$ = 867.243 | $d_{19}$ = 14.09 | $n_{10}$ = 1.73235 | 54.8 |
| $r_{20}$ = −425.155 | $d_{20}$ = 9.02 | | |
| $r_{21}$ = 398.531 | $d_{21}$ = 14.09 | $n_{11}$ = 1.73235 | 54.8 |
| $r_{22}$ = −1722.209 | $d_{22}$ = 70.44 | | |
| $r_{23}$ = −107.246 | $d_{23}$ = 14.09 | $n_{12}$ = 1.58483 | 40.8 |
| $r_{24}$ = −733.498 | | | |

The following table I sets forth the Seidel's terms for $e$-line compensation in example I wherein $S_1$ denotes spherical aberration, $S_2$ coma aberration, $S_3$ astigmatism, P Petzval term and $S_5$ distortion aberration:

TABLE I (Seidel's Terms of $e$-line Compensation)

| | $S_1$ | $S_2$ | $S_3$ | P | $S_5$ |
|---|---|---|---|---|---|
| 1 | 0.055 | 0.082 | 0.120 | 0.051 | 0.253 |
| 2 | −0.521 | 0.105 | −0.021 | −0.352 | 0.075 |
| 3 | 0.403 | 0.267 | 0.176 | 0.025 | 0.133 |
| 4 | −0.016 | −0.056 | −0.197 | 0.108 | −0.312 |
| 5 | 0.311 | 0.232 | 0.173 | 0.102 | 0.206 |
| 6 | −0.000 | −0.006 | −0.083 | 0.050 | −0.412 |
| 7 | 0.041 | 0.070 | 0.120 | 0.076 | 0.337 |
| 8 | 0.002 | −0.013 | 0.062 | 0.048 | −0.507 |
| 9 | −0.653 | 0.505 | −0.391 | −0.405 | 0.617 |
| 10 | −2.274 | −1.049 | −0.484 | −0.143 | −0.289 |
| 11 | 2.340 | 1.103 | 0.520 | 0.146 | 0.314 |
| 12 | 0.327 | −0.222 | 0.151 | 0.295 | −0.304 |
| 13 | 0.327 | 0.266 | 0.217 | 0.295 | 0.417 |
| 14 | 2.340 | −0.788 | 0.265 | 0.146 | −0.138 |
| 15 | −2.274 | 0.743 | −0.243 | −0.143 | 0.126 |
| 16 | −0.653 | −0.593 | −0.539 | −0.405 | −0.858 |
| 17 | 0.002 | 0.013 | 0.065 | 0.048 | 0.539 |
| 18 | 0.041 | −0.064 | 0.102 | 0.076 | −0.281 |
| 19 | −0.000 | 0.006 | −0.081 | 0.050 | 0.385 |
| 20 | 0.311 | −0.190 | 0.116 | 0.102 | −0.134 |
| 21 | −0.016 | 0.054 | −0.183 | 0.108 | 0.250 |
| 22 | 0.403 | −0.212 | 0.112 | 0.025 | −0.072 |
| 23 | −0.521 | −0.175 | −0.058 | −0.352 | −0.138 |
| 24 | 0.055 | −0.074 | 0.099 | 0.051 | −0.202 |
| SUM | 0.030 | 0.002 | 0.020 | 0.003 | 0.004 |

FIG. 4 illustrates the curves for spherical aberration and sine condition, distortion and astigmatism for the lens system of example I.

In FIG. 3 of the drawings there is shown another embodiment of the present invention which differs from that shown in FIG. 2 only in that doublets are substituted for the single element lens 6 and 7 of the FIG. 2 embodiment. Specifically, in place of lens 6 a doublet including a negative meniscus front element 6A with a concave rear surface and a double convex rear element 6B, the confronting faces of elements 6A and 6B being cemented and mating and defining a single lens face. Similarly, lens 7 is substituted by a cemented rear doublet symmetrical to the front doublet and including a front double convex positive element 7A and a rear negative element 7B corresponding to elements 6B and 6A respectively, the cemented surfaces defining a single lens face. The fourth and ninth lenses are positive meniscus lenses with convex outer faces and in all other respects the embodiments shown in FIGS. 2 and 3 are similar.

The lens faces are successively designated with the cemented element surfaces defining a single lens face, $r_i$ being the radius of curvature of the $i$th lens face and $d_i$ being the axial distance between the $i$th lens face and the next successive lens face.

The following example II sets forth the specific values and relationships of a lens system shown in FIG. 3, the lens system having a brightness value of 1:2.5, a numerical aperture value of 0.1, F=108.2, $f_B = f_B' = 112.63$, and $g$-line compensation up to the h-line:

EXAMPLE II

| R | D | $N_g$ | $V_d$ |
|---|---|---|---|
| $r_1$ = 702.530 | $d_1$ = 14.09 | $n_1$ = 1.52619 | 64.1 |
| $r_2$ = 90.467 | $d_2$ = 59.17 | | |
| $r_3$ = 981.847 | $d_3$ = 14.09 | $n_2$ = 1.71060 | 50.7 |
| $r_4$ = −351.480 | $d_4$ = 9.02 | | |
| $r_5$ = 240.286 | $d_5$ = 14.09 | $n_3$ = 1.71060 | 50.7 |
| $r_6$ = 1644.629 | $d_6$ = 0.56 | | |
| $r_7$ = 267.123 | $d_7$ = 14.09 | $n_4$ = 1.77707 | 35.0 |
| $r_8$ = 925.180 | $d_8$ = 11.27 | | |
| $r_9$ = −152.079 | $d_9$ = 18.74 | $n_5$ = 1.74917 | 29.5 |
| $r_{10}$ = 195.727 | $d_{10}$ = 4.23 | | |
| $r_{11}$ = 322.505 | $d_{11}$ = 8.45 | $n_{4A}$ = 1.74566 | 54.8 |
| $r_{12}$ = 92.741 | $d_{12}$ = 19.72 | $n_{6B}$ = 1.79330 | 49.2 |
| $r_{13}$ = −171.138 | $d_{13}$ = 5.68 | | |
| $r_{14}$ = 171.138 | $d_{14}$ = 19.72 | $n_{7A}$ = 1.79330 | 49.2 |
| $r_{15}$ = −92.741 | $d_{15}$ = 8.45 | $n_{7B}$ = 1.74566 | 54.8 |
| $r_{16}$ = −322.505 | $d_{16}$ = 4.23 | | |
| $r_{17}$ = −195.727 | $d_{17}$ = 18.74 | $n_8$ = 1.74917 | 29.5 |
| $r_{18}$ = 152.079 | $d_{18}$ = 11.27 | | |
| $r_{19}$ = −925.180 | $d_{19}$ = 14.09 | $n_9$ = 1.77707 | 35.0 |
| $r_{20}$ = −267.123 | $d_{20}$ = 0.56 | | |
| $r_{21}$ = −1644.629 | $d_{21}$ = 9.02 | | |
| $r_{23}$ = 351.480 | $d_{23}$ = 14.09 | $n_{11}$ = 1.71060 | 50.7 |
| $r_{24}$ = −981.847 | $d_{24}$ = 59.17 | | |
| $r_{25}$ = −90.467 | $d_{25}$ = 14.09 | $n_{12}$ = 1.52619 | 64.1 |
| $r_{26}$ = −702.530 | | | |

The following table II sets forth the Seidel's terms for $g$-line compensation in example II:

TABLE II

|   | $S_1$ | $S_2$ | $S_3$ | P | $S_5$ |
|---|---|---|---|---|---|
| 1 | 0.054 | 0.079 | 0.116 | 0.053 | 0.248 |
| 2 | −0.769 | 0.250 | −0.081 | −0.412 | 0.160 |
| 3 | 0.487 | 0.250 | 0.129 | 0.045 | 0.090 |
| 4 | −0.008 | −0.040 | −0.195 | 0.127 | −0.329 |
| 5 | 0.501 | 0.244 | 0.119 | 0.187 | 0.149 |
| 6 | −0.012 | −0.036 | −0.106 | −0.027 | −0.389 |
| 7 | 0.119 | 0.121 | 0.123 | 0.177 | 0.305 |
| 8 | 0.000 | 0.000 | 0.002 | −0.051 | −0.544 |
| 9 | −0.173 | 0.224 | −0.289 | −0.304 | 0.766 |
| 10 | −2.660 | −1.054 | −0.417 | −0.236 | −0.259 |
| 11 | 1.874 | 0.922 | 0.453 | 0.143 | 0.293 |
| 12 | 0.426 | 0.079 | 0.014 | 0.017 | 0.006 |
| 13 | 0.174 | −0.165 | 0.157 | 0.279 | −0.414 |
| 14 | 0.174 | 0.169 | 0.165 | 0.279 | 0.433 |
| 15 | 0.426 | −0.068 | 0.011 | 0.017 | −0.004 |
| 16 | 1.874 | −0.877 | 0.410 | 0.143 | −0.258 |
| 17 | −2.660 | 0.989 | −0.368 | −0.236 | 0.225 |
| 18 | −0.173 | −0.228 | −0.300 | −0.304 | −0.795 |
| 19 | 0.000 | −0.000 | 0.002 | −0.051 | 0.542 |
| 20 | 0.119 | −0.118 | 0.117 | 0.177 | −0.292 |
| 21 | −0.012 | 0.036 | −0.105 | −0.027 | 0.381 |
| 22 | 0.501 | −0.232 | 0.108 | 0.187 | −0.136 |
| 23 | −0.008 | 0.039 | −0.193 | 0.127 | 0.318 |
| 24 | 0.487 | −0.239 | 0.117 | 0.045 | −0.079 |
| 25 | −0.769 | −0.269 | −0.094 | −0.412 | −0.177 |
| 26 | 0.054 | −0.078 | 0.112 | 0.053 | −0.238 |
| SUM | 0.026 | 0.000 | 0.008 | −0.001 | 0.000 |

FIG. 5 illustrates the curves for spherical aberration and sine condition, distortion and astigmatism for the lens system of example II.

As seen in tables I and II the sums of each of the Seidel's terms are very small. Moreover, the curves illustrated in FIGS. 4 and 5 demonstrate that in both e-line and g-line compensation in the present improved lens system, the aberrations up to ± 39.6 mm. image extension are excellently compensated. It should be noted that since the rays traversing diaphragm F are parallel to the lens system optical axis, an optical filter may be positioned anywhere between the lenses 6 and 7 or lens elements 6B and 7A without effecting the aberration conditions of the lens system.

While there have been described and illustrated preferred embodiments of the present invention, it is apparent that numerous alterations omissions and additions may be made without departing from the spirit thereof.

What is claimed is:

1. A substantially unity magnification lens system comprising 12 consecutively designated lenses including a symmetrical pair of front and rear substantially similar telephoto lens system each including a negative outer lens group and a positive inner lens group in which the first lens is negative with a concave rear face, the second lens is positive with a convex rear face, the third lens is positive with a convex front face, the fourth lens is positive with a convex front face, the fifth and eight lenses are doubly concave, the sixth and seventh lenses are doubly convex, the ninth lens is positive with a convex rear face, the tenth lens is positive with a convex rear face, the eleventh lens is positive with a convex front face, and the twelfth lens is negative with a concave front face.

2. The lens system of claim 1 wherein said sixth lens is a doublet including a negative front lens element with a concave rear surface and a double convex rear lens element and said seventh lens is a doublet including a double convex front lens element and a negative rear lens element with a concave front surface.

3. The lens system of claim 1 comprising 12 consecutively designated single element lenses having 24 consecutively designated lens faces and possessing the following dimensions and relationships:

| | | |
|---|---|---|
| $r_1 = 733.498$ | | |
| $r_2 = 107.246$ | $d_2 = 70.44$ | |
| $r_3 = 1722.209$ | | |
| $r_4 = -398.531$ | $d_4 = 9.02$ | |
| $r_5 = 425.155$ | | |
| $r_6 = -867.243$ | $d_6 = 0.56$ | |
| $r_7 = 568.460$ | | |
| $r_8 = -896.762$ | | |
| $r_{10} = 279.822$ | $d_{10} = 1.41$ | |
| $r_{11} = 296.460$ | | |
| $r_{12} = -146.748$ | $d_{12} = 10.40$ | |
| $r_{13} = 146.748$ | | |
| $r_{14} = -296.460$ | $d_{14} = 1.41$ | |
| $r_{15} = -279.822$ | $d_{15} = 18.74$ $n_8 = 1.64419$ | 34.6 |
| $r_{16} = 99.030$ | $d_{16} = 11.27$ | |
| $r_{17} = 896.762$ | $d_{17} = 14.09$ $n_9 = 1.73235$ | 54.8 |
| $r_{18} = -568.460$ | $d_{18} = 0.56$ | |
| $r_{19} = 867.243$ | $d_{19} = 14.09$ $n_{10} = 1.73235$ | 54.8 |
| $r_{20} = -425.155$ | $d_{20} = 9.02$ | |
| $r_{21} = 398.531$ | $d_{21} = 14.09$ $n_{11} = 1.73235$ | 54.8 |
| $r_{22} = -1722.209$ | $d_{22} = 70.44$ | |
| $r_{23} = -107.246$ | $d_{23} = 14.09$ $n_{12} = 1.58483$ | 40.8 |
| $r_{24} = -733.498$ | | | wherein $r_i$ is the radius of curvature of the $i$th lens face, $d_i$ is the axial distance between the $i$th lens face and the $i+1$ lens face, and $n_n$ is the index of refraction of the $n$th lens.

4. The lens system of claim 1 comprising 12 consecutively designated lenses, the sixth and seventh lenses being doublets with single lens face defining cemented confronting mating surfaces, the lens elements of said doublets being consecutively designated as 6A, 6B, 7A, and 7B respectively, the remaining lenses being single element lenses, said lenses possessing the following dimensions and relationships:

| | | | |
|---|---|---|---|
| $r_1 = 702.530$ | $d_1 = 14.09$ | $n_1 = 1.52619$ | 64.1 |
| $r_2 = 90.467$ | $d_2 = 59.17$ | | |
| $r_3 = 981.847$ | $d_3 = 14.09$ | $n_2 = 1.71060$ | 50.7 |
| $r_4 = -351.480$ | $d_4 = 9.02$ | | |
| $r_5 = 240.286$ | $d_5 = 14.09$ | $n_3 = 1.71060$ | 50.7 |
| $r_6 = 1644.629$ | $d_6 = 0.56$ | | |
| $r_7 = 267.123$ | $d_7 = 14.09$ | $n_4 = 1.77707$ | 35.0 |
| $r_8 = 925.180$ | $d_8 = 11.27$ | | |
| $r_9 = -152.079$ | $d_9 = 18.74$ | $n_5 = 1.74917$ | 29.5 |
| $r_{10} = 195.727$ | $d_{10} = 4.23$ | | |
| $r_{11} = 322.505$ | $d_{11} = 8.45$ | $n_{6A} = 1.74566$ | 54.8 |
| $r_{12} = 92.741$ | $d_{12} = 19.72$ | $n_{6B} = 1.79330$ | 49.2 |
| $r_{13} = -171.138$ | $d_{13} = 5.68$ | | |
| $r_{14} = 171.138$ | $d_{14} = 19.72$ | $n_{7A} = 1.79330$ | 49.2 |
| $r_{15} = -92.741$ | $d_{15} = 8.45$ | $n_{7B} = 1.74566$ | 54.8 |
| $r_{16} = -322.505$ | $d_{16} = 4.23$ | | |
| $r_{17} = -195.727$ | $d_{17} = 18.74$ | $n_8 = 1.74917$ | 29.5 |
| $r_{18} = 152.079$ | $d_{18} = 11.27$ | | |
| $r_{19} = -925.180$ | $d_{19} = 14.09$ | $n_9 = 1.77707$ | 35.0 |
| $r_{20} = -267.123$ | $d_{20} = 0.56$ | | |
| $r_{21} = -1644.629$ | $d_{21} = 14.09$ | $n_{10} = 1.71060$ | 50.7 |
| $r_{22} = -240.286$ | $d_{22} = 9.02$ | | |
| $r_{23} = 351.480$ | $d_{23} = 14.09$ | $n_{11} = 1.71060$ | 50.7 |
| $r_{24} = -981.847$ | $d_{24} = 59.17$ | | |
| $r_{25} = -90.467$ | $d_{25} = 14.09$ | $n_{12} = 1.52619$ | 64.1 |
| $r_{26} = -702.530$ | | | | wherein $r_i$ is the radius of curvature of the $i$th lens face, $d_i$ is the axial distance between the $i$th lens face and the $i+1$ lens face, and $n_n$ is the index of refraction of the $n$th lens.